US012712691B2

(12) United States Patent
Yuan et al.

(10) Patent No.: US 12,712,691 B2
(45) Date of Patent: Aug. 18, 2026

(54) TECHNIQUES FOR CONFIGURING PATH LOSS REFERENCE SIGNALS IN WIRELESS COMMUNICATIONS

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/286,722

(22) PCT Filed: May 19, 2021

(86) PCT No.: PCT/CN2021/094513
§ 371 (c)(1),
(2) Date: Oct. 12, 2023

(87) PCT Pub. No.: WO2022/241665
PCT Pub. Date: Nov. 24, 2022

(65) Prior Publication Data
US 2024/0195567 A1 Jun. 13, 2024

(51) Int. Cl.
*H04L 5/00* (2006.01)

(52) U.S. Cl.
CPC .......... *H04L 5/0051* (2013.01); *H04L 5/0094* (2013.01)

(58) Field of Classification Search
None
See application file for complete search history.

(56) References Cited

U.S. PATENT DOCUMENTS

2019/0349866 A1 11/2019 Lin et al.
2019/0349867 A1 11/2019 Molavianjazi et al.
2020/0220802 A1* 7/2020 Goliya ................ H04L 41/0894
2022/0232573 A1* 7/2022 Farag ................ H04W 72/0446
2023/0318686 A1* 10/2023 Kwak .................. H04B 7/0639
455/101

FOREIGN PATENT DOCUMENTS

CN 111277395 A 6/2020
CN 111954249 A 11/2020

OTHER PUBLICATIONS

International Search Report and Written Opinion—PCT/CN2021/094513—ISA/EPO—Feb. 10, 2022.
Moderator (Samsung): "Moderator Summary for Multi-Beam Enhancement: Proposal Categorization", 3GPP TSG RAN WG1 #102-e, R1-2006985, e-Meeting, Aug. 17, 2020-Aug. 28, 2020, Aug. 25, 2020, 27 Pages, sections 1-2, section 4.1, Appendix A.

(Continued)

*Primary Examiner* — Phirin Sam
(74) *Attorney, Agent, or Firm* — ArentFox Schiff, LLP

(57) ABSTRACT

Aspects described herein relate to communicating a configuration for a unified transmission configuration indicator (TCI) state that includes a TCI state identifier and a path loss reference signal (PLRS) identifier, communicating a PLRS associated with the PLRS identifier, and/or transmitting an uplink channel transmission associated with the PLRS and the TCI state identifier.

30 Claims, 6 Drawing Sheets

500

(56) References Cited

OTHER PUBLICATIONS

Samsung: "Multi-Beam Enhancements", 3GPP TSG RAN WG1 #102-e, R1-2006991, e-Meeting, Aug. 17-28, 2020 (Aug. 28, 2020), 15 Pages, Aug. 25, 2020 (Aug. 25, 2020), Section 3, 3.1, 3.2, part 3, the whole document.

Mediatek Inc: "Enhancement on Multi-Beam Operation", 3GPP TSG RAN WG1 #104-e, R1-2100588, 3rd Generation Partnership Project (3GPP), Mobile Competence Centre, 650, Route Des Lucioles, F-06921, Sophia-Antipolis Cedex, France, vol. RAN WG1, No. e-Meeting; Jan. 25, 2021-Feb. 5, 2021, Jan. 19, 2021, XP051971059, 27 Pages, p.4-p. 6, Table 1.

Supplementary European Search Report—EP21940122—Search Authority—The Hague—Jan. 15, 2025.

* cited by examiner

TECHNIQUES FOR CONFIGURING PATH LOSS REFERENCE SIGNALS IN WIRELESS COMMUNICATIONS

CROSS-REFERENCE TO RELATED APPLICATIONS

This application is a 35 U.S.C. § 371 National Phase Application of PCT Application No. PCT/CN2021/094513 filed May 19, 2021, entitled "TECHNIQUES FOR CONFIGURING PATH LOSS REFERENCE SIGNALS IN WIRELESS COMMUNICATIONS," which is assigned to the assignee hereof and hereby incorporated by reference herein.

BACKGROUND

Aspects of the present disclosure relate generally to wireless communication systems, and more particularly, to transmitting or receiving reference signals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, path loss reference signals (PLRS) are used for estimating path loss between communicating nodes (e.g., between a user equipment (UE) and base station). A base station in 5G NR separately configures the path loss reference signal to be used for each of physical uplink control channel (PUCCH) transmission, physical uplink shared channel (PUSCH) transmission, and sounding reference signal (SRS) transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication at a user equipment (UE) is provided that includes receiving a configuration for a unified transmission configuration indicator (TCI) state that includes a TCI state identifier and a path loss reference signal (PLRS) identifier, receiving a PLRS associated with the PLRS identifier, and transmitting an uplink channel transmission associated with the PLRS and the TCI state identifier.

In another aspect, a method for wireless communication at a network node is provided that includes transmitting a configuration for a unified transmission configuration indicator (TCI) state that includes a TCI state identifier and a path loss reference signal (PLRS) identifier, transmitting a PLRS associated with on the PLRS identifier, and receiving an uplink channel transmission associated with the PLRS and the TCI state identifier.

In another aspect, an apparatus is provided that can include a transceiver, a memory configured to store instructions, and one or more processors communicatively coupled with the transceiver and the memory. The one or more processors may be configured to execute the instructions to perform the operations of one or more of the methods described above and further herein.

In another aspect, an apparatus is provided that can include means for performing one or more of the methods described above and further herein.

In another aspect, a computer-readable medium is provided that can include code executable by one or more processors to perform one or more of the methods described above and further herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
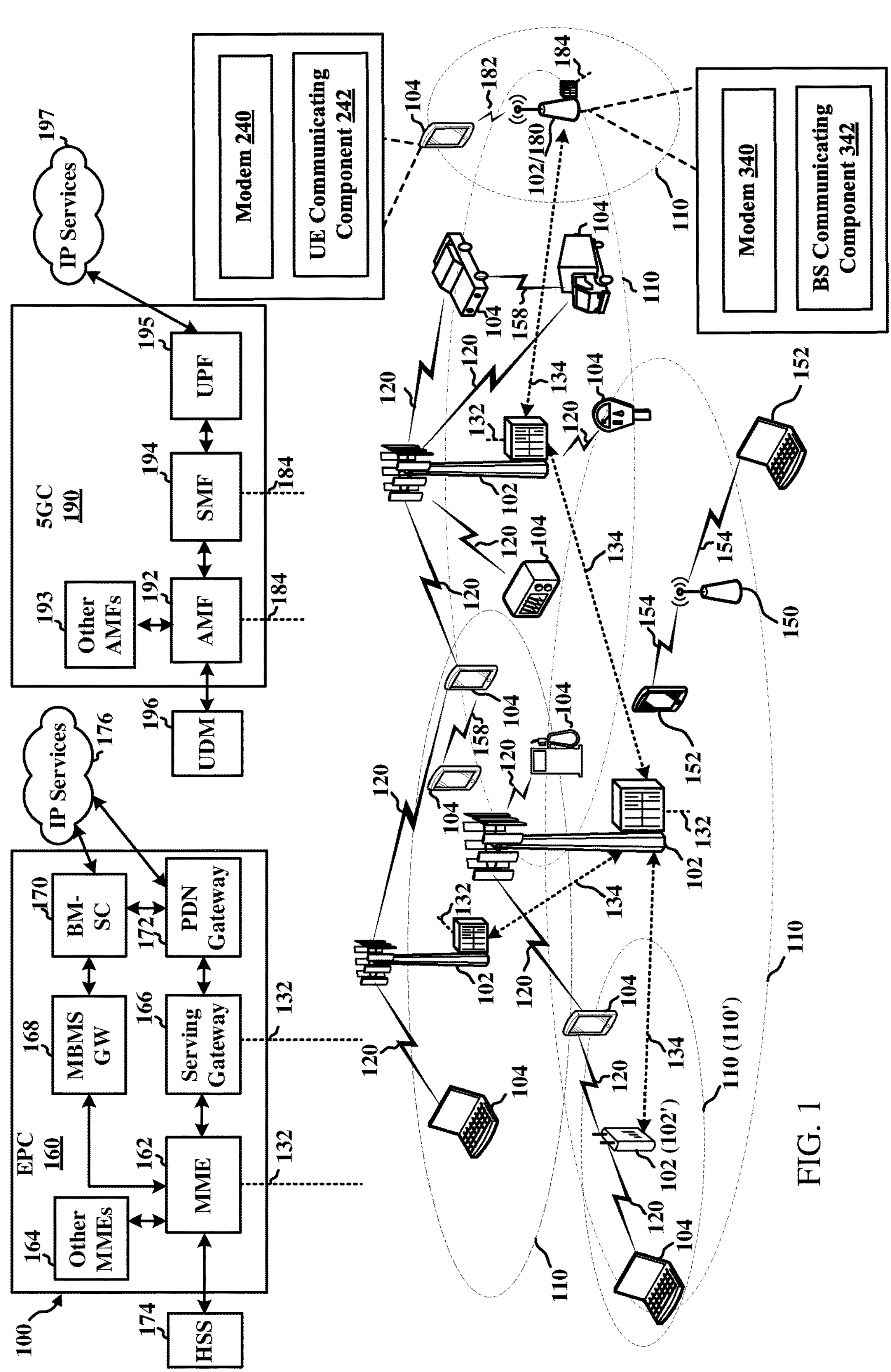
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring path loss reference signal (PLRS) in wireless communications. In wireless communication technologies such as fifth generation (5G) new radio (NR), network nodes, such as base stations, can transmit PLRSs, which can be received by user equipment (UE) or other receiving nodes and used for estimating path loss for transmitting uplink communications from the receiving node to the network node. The network node can configure the PLRSs as well, which can be configured per uplink channel or sounding reference signal (SRS) and may include an indication of a synchronization signal block (SSB) signal, channel state information reference signal (CSI-RS), or other signal that can be used as a PLRS to estimate the path loss. For example, the network node can separately configure, in radio resource control (RRC) signaling, PLRS for PUCCH in a PUCCH-Pathloss-ReferenceRS information element (IE), for PUSCH in a PUSCH-PowerControl IE indicating a list of pathlossReferenceRS IEs, for SRS in a SRS-ResourceSet IE, etc. In addition, in 5G NR, network nodes can configure transmission control indicator (TCI) states for a UE, where a TCI state can correspond to, or indicate, a quasi-colocation (QCL) relationship between downlink reference signals and demodulation reference signal (DMRS) ports for downlink channel transmissions, a beam to use in receiving downlink communications (or transmitting uplink communications), etc.

In some wireless communication technologies, such as 5G NR, unified TCI states allow for configuring of common beams for channels and/or reference signals. For example, in 5G NR, a network node may configure a UE with unified TCI states via RRC signaling. The unified TCI states may be configured according to one or more types, including Type 1: joint downlink (DL)/uplink (UL) common TCI state to indicate a common beam for at least one DL channel/reference signal (RS) plus at least one UL channel/RS, Type 2: separate DL common TCI state to indicate a common beam for more than one DL channel/RS, Type 3: separate UL common TCI state to indicate a common beam for more than one UL channel/RS, Type 4: separate DL single channel/RS TCI state to indicate a beam for a single DL channel/RS, Type 5: separate UL single channel/RS TCI state to indicate a beam for a single UL channel/RS, or Type 6: UL spatial relation information (SRI) to indicate a beam for a single UL channel/RS.

Aspects described herein relate to a network node transmitting, or a UE receiving, a unified TCI state configuration that indicates a PLRS configuration or related parameters for the unified TCI state. For example, the unified TCI state configuration may include a PLRS identifier that corresponds to a common PLRS for multiple uplink channels or that is a common identifier used to indicate separate PLRSs for each of the multiple uplink channels. In one example, the UE can receive a PLRS configuration including a common PLRS list, where the unified TCI configuration can select a common PLRS from the list. In another example, the UE can receive multiple individual PLRS lists configured per uplink channel transmission, where the unified TCI configuration can select a common PLRS identifier that can map to different PLRSs in each of the individual lists. In any case, for example, a UE receiving the unified TCI state configuration can determine, based on the PLRS identifier indicated for the unified TCI state, the PLRS to use in transmitting a corresponding uplink channel transmission.

Indicating PLRS for unified TCI states in this regard, for example, can conserve signaling resources and communications by using the common identifier for uplink channel transmissions related to the unified TCI states, rather than requiring separate configuration of each PLRS for each uplink channel transmission of each TCI state. Additionally, indicating the PLRS in the unified TCI state configuration, for example, can conserve signaling resources and communications by not requiring separate configuration signaling for PLRS configuration.

The described features will be presented in more detail below with reference to FIGS. 1-6.

As used in this application, the terms “component,” “module,” “system” and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms “system” and “network” may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named “3rd Generation Partnership Project” (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for receiving a unified TCI state configuration indicating a PLRS to use for uplink channel transmissions, in accordance with aspects described herein. In addition, some nodes may have a modem 340 and BS communicating component 342 for transmitting a unified TCI state configuration indicating a PLRS to use for uplink channel transmissions, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can receive a unified TCI state configuration indicating a PLRS for uplink channel transmission associated with the TCI state. In this regard, for example, UE communicating component 242 can receive a signal as a PLRS associated with the PLRS indication in the unified TCI state configuration. The PLRS indication can be common for multiple uplink channel transmissions or specific to one or more uplink channel transmissions. In any case, UE communicating component 242 can transmit the uplink channel transmission based on the PLRS indication. In addition, for example, BS communicating component 342 can transmit the PLRS indication in the unified TCI state configuration. BS communicating component 342, for example, may receive the uplink channel transmission based on the PLRS indication.

Figure 2:
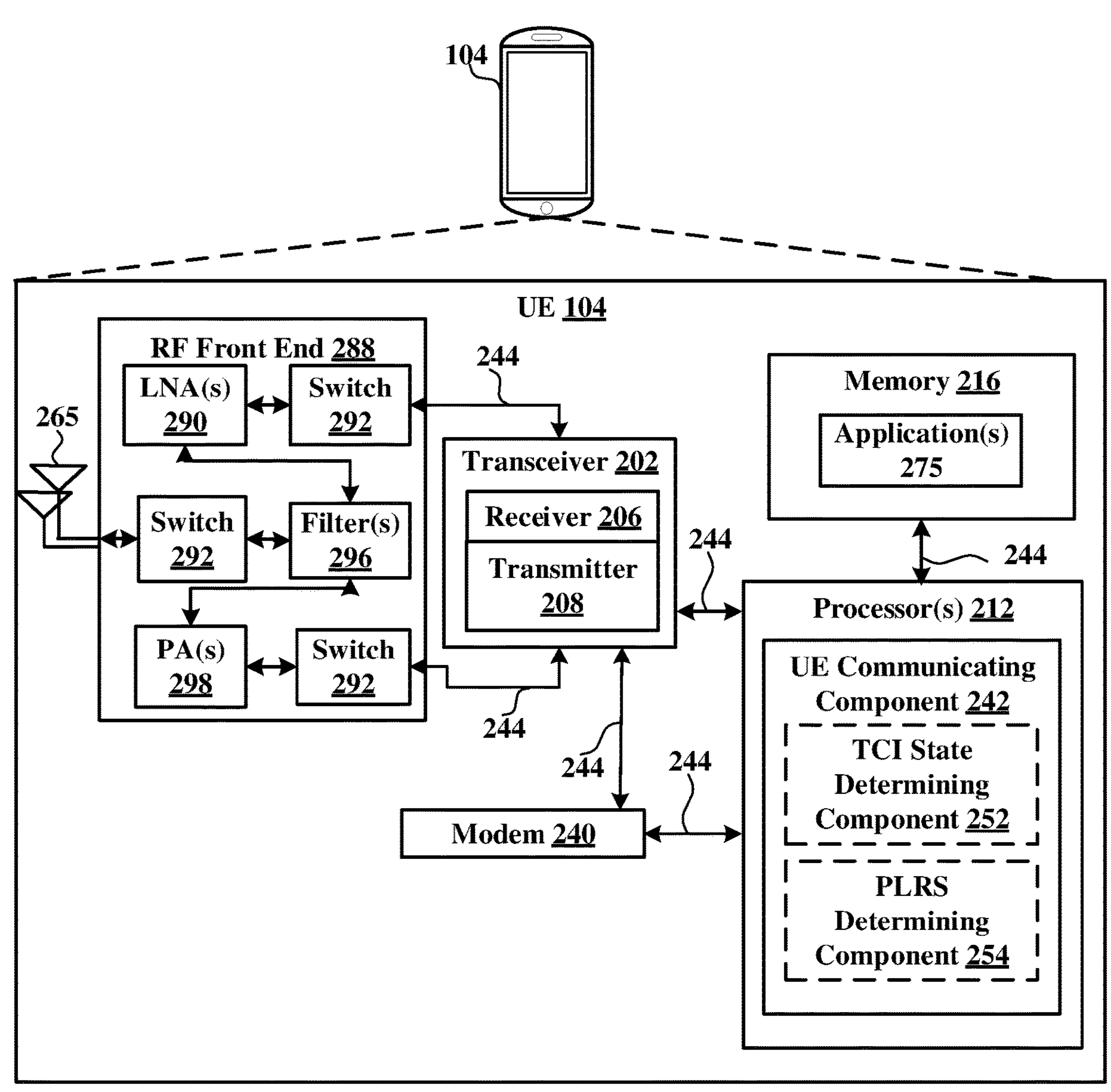
FIG. 2 is a block diagram illustrating an example of a UE, in accordance with various aspects of the present disclosure.
Figure 3:
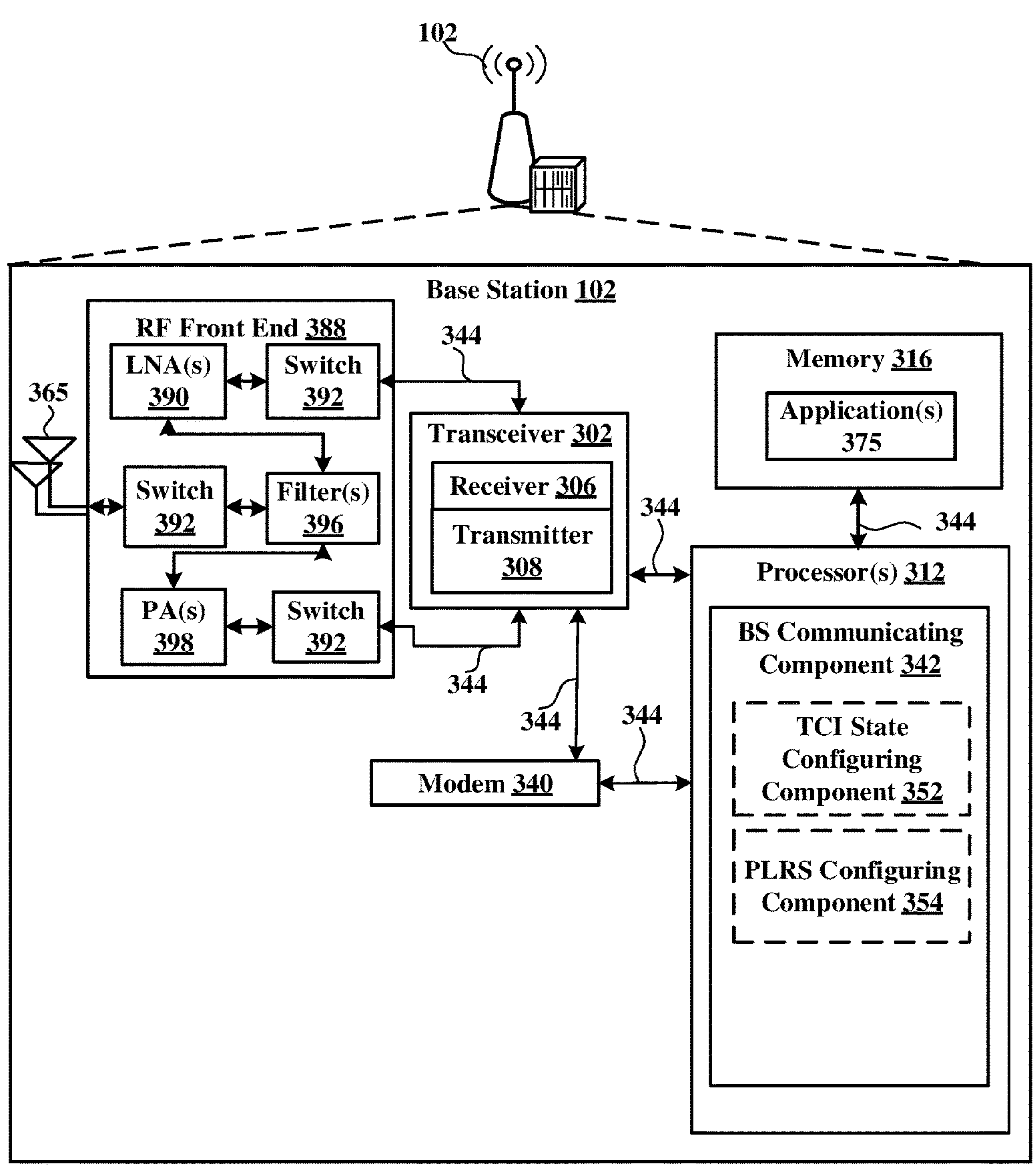
FIG. 3 is a block diagram illustrating an example of a base station, in accordance with various aspects of the present disclosure.
Figure 4:
FIG. 4 is a flow chart illustrating an example of a method for transmitting a unified transmission control indicator (TCI) state configuration indicating a path loss reference signal (PLRS) to use for uplink channel transmissions, in accordance with aspects described herein.
Figure 4:
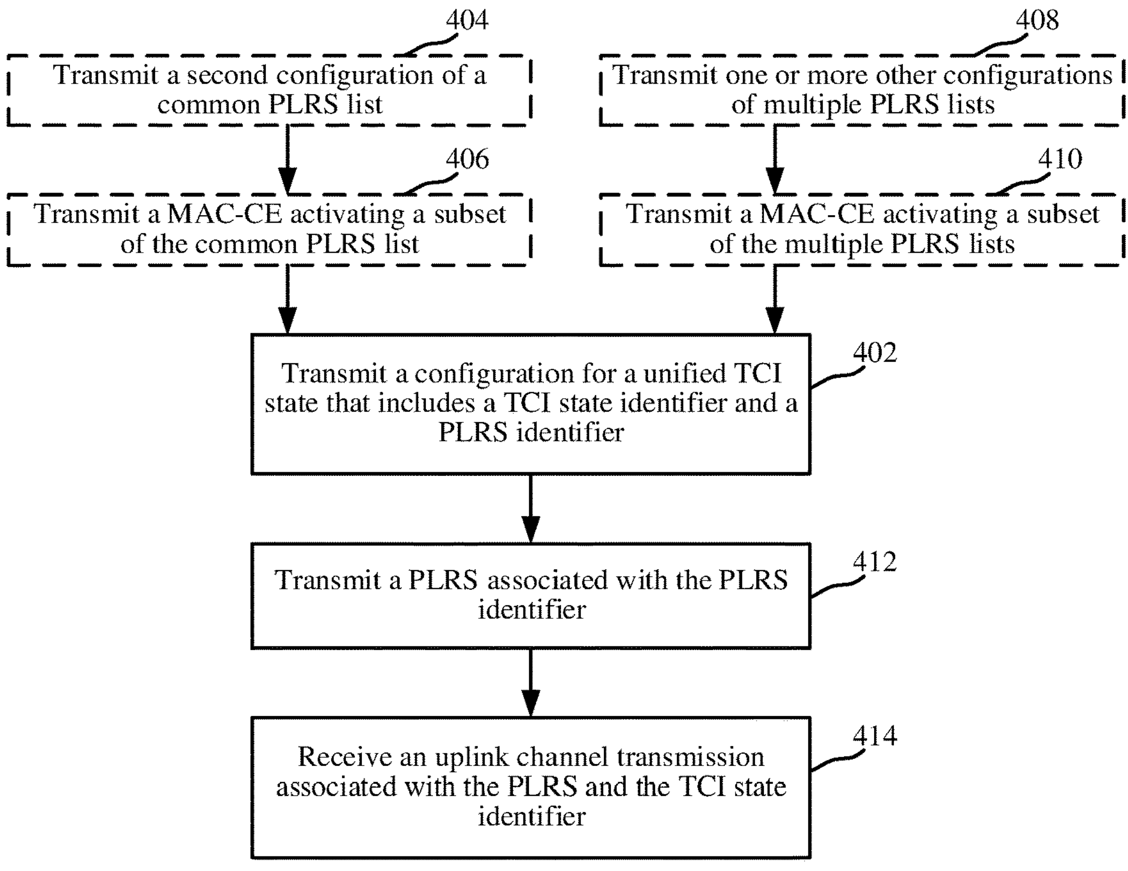
Figure 5:
FIG. 5 is a flow chart illustrating an example of a method for receiving a unified TCI state configuration indicating a PLRS to use for uplink channel transmissions, in accordance with aspects described herein.
Figure 5:
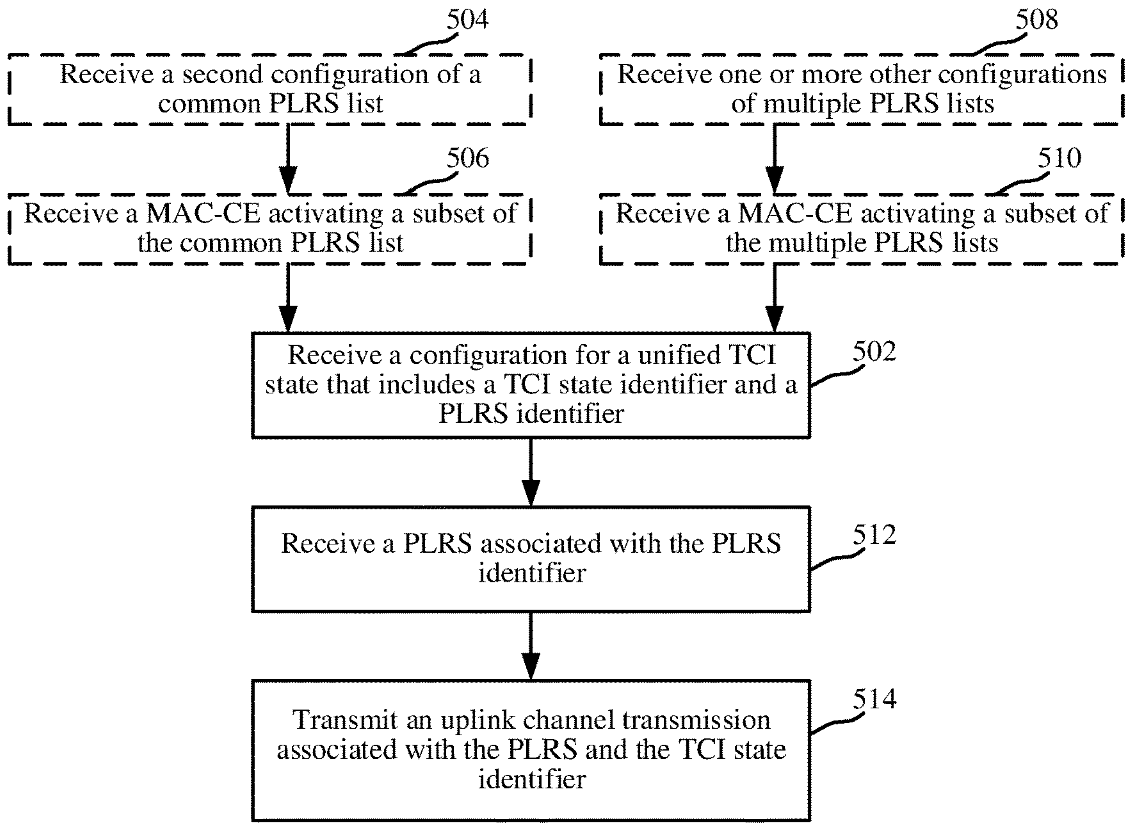

Turning now to FIGS. 2-6, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for receiving a unified TCI state configuration indicating a PLRS to use for uplink channel transmissions, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAS) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a TCI state determining component 252 for determining a unified TCI state configured for multiple uplink channel transmissions, and/or a PLRS determining component 254 for determining a PLRS indicated for one or more of the multiple uplink channel transmissions, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for transmitting a unified TCI state configuration indicating a PLRS to use for uplink channel transmissions, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a TCI state configuring component 352 for configuring a unified TCI state for multiple uplink channel transmissions of a UE, and/or a PLRS configuring component 354 for configuring a PLRS associated with the unified TCI state, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for transmitting a unified TCI state configuration indicating a PLRS to use for uplink channel transmissions, in accordance with aspects described herein. FIG. 5 illustrates a flow chart of an example of a method 500 for receiving a unified TCI state configuration indicating a PLRS to use for uplink channel transmissions, in accordance with aspects described herein. In an example, a base station can perform the functions described in method 400 using one or more of the components described in FIG. 1 or 3. In an example, a UE 104 can perform the functions described in method 500 using one or more of the components described in FIG. 1 or 2. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In method 400, at Block 402, a configuration for a unified TCI state that includes a TCI state identifier and a PLRS identifier can be transmitted. In an aspect, TCI state configuring component 352, e.g., in conjunction with processor(s) 312, memory 316, transceiver 302, BS communicating component 342, etc., can transmit (e.g., to UE 104 or other receiving or downstream device) the configuration for the unified TCI state that includes the TCI state identifier and the PLRS identifier. For example, TCI state configuring component 352 can transmit the unified TCI state configuration in RRC signaling to the UE 104. For example, the unified TCI state configuration can indicate a unified TCI state for multiple channels and/or RSs, as described above. In one specific example, the unified TCI state configuration can indicate a unified TCI state for multiple uplink channels or corresponding transmissions, which may include a PUCCH, PUSCH, SRS, and/or the like. In some examples, the TCI state configuration may include a PLRS identifier. In some other examples, the TCI state may be configured to be associated with a PLRS identifier.

In an example, the base station 102 can configure a pool (or list) of multiple TCI states that can be used for unified TCI state configuration and/or can activate a subset of the pool of multiple TCI states. In a specific example, TCI state configuring component 352 can configure the pool of TCI states via RRC signaling and/or can activate the subset of the pool TCI states via MAC-CE. In another example, TCI state configuring component 352 can configure a specific unified TCI state for an uplink channel transmission based on transmitting, to the UE, a downlink control information (DCI) selecting one of the unified TCI states (e.g., indicating an index of the unified TCI state within the activated subset). In any case, for example, the unified TCI state configuration can indicate the unified TCI state by an identifier associated with the configuration(s), where the identifier can map to one of the TCI states in the pool of multiple TCI states or the activated subset of TCI states. In an example, the identifier can be an index into the configured pool or activated subset of TCI states. The unified TCI state configuration may also include or associate with a PLRS identifier for the unified TCI state, as described above and further herein, where the PLRS identifier can identify the PLRS to be used as a path loss reference for transmitting uplink channel transmissions corresponding to the unified TCI state.

In method 500, at Block 502, a configuration for a unified TCI state that includes a TCI state identifier and a PLRS identifier can be received. In an aspect, TCI state determining component 252, e.g., in conjunction with processor(s) 212, memory 216, transceiver 202, UE communicating component 242, etc., can receive (e.g., from base station 102 or other network node or upstream node) the configuration for the unified TCI state that includes the TCI state identifier and the PLRS identifier. For example, TCI state determining component 252 can receive the configuration for the unified TCI state including one or more of a RRC configuration of a pool of unified TCI states, a MAC-CE activating a subset of the unified TCI states, a DCI selecting one of the unified TCI states (e.g., an index of the activated subset), etc. In addition, in this example, the TCI state determining component 252 can receive the configuration for the unified TCI state as an identifier associated with the configuration(s) of TCI states (e.g., as an index into the pool of TCI states, the activated subset of TCI states, etc.). In any case, as described further herein, the UE 104 can select or determine a PLRS for an uplink channel transmission based on the unified TCI state and the PLRS identifier specified for the unified TCI state in one or more configurations.

In method 400, optionally at Block 404, a second configuration of a common PLRS list can be transmitted. In an aspect, PLRS configuring component 354, e.g., in conjunction with processor(s) 312, memory 316, transceiver 302, BS communicating component 342, etc., can transmit the second configuration of the common PLRS list. For example, the common PLRS list can indicate one or more PLRSs that can be included or associated with a unified TCI state for uplink channel transmissions. The common PLRS list may include a list of PLRSs for uplink transmissions, such as a list of SSB indices, CSI-RS indices (e.g., at least non-zero power CSI-RSs), or other signals, that can be used to identify certain downlink signals as PLRSs, along with an identifier associated to each PLRS in the list. In this regard, the common PLRS list can indicate the PLRS and index such that the PLRS can be determined based on the PLRS identifier specified for a configured unified TCI state in the unified TCI state configuration, as described. In an example, the unified TCI state configuration may indicate a single PLRS in the common PLRS list to be applied for all uplink channel transmissions that are applicable for the unified TCI state (e.g., PUCCH, PUSCH, and SRS).

In method 500, optionally at Block 504, a second configuration of a common PLRS list can be received. In an aspect, PLRS determining component 254, e.g., in conjunction with processor(s) 212, memory 216, transceiver 202, UE communicating component 242, etc., can receive the second configuration of the common PLRS list. For example, the common PLRS list can indicate one or more PLRSs that can be configured for uplink channel transmissions of a unified TCI state. The common PLRS list may include a list of PLRSs for uplink transmissions, such as a list of SSB indices, CSI-RS indices (e.g., at least non-zero power CSI-RSs), or other signals, that can be used to identify certain downlink signals received from a base station 102 as PLRSs, along with an identifier associated to each PLRS in the list. In this regard, the common PLRS list can indicate the PLRS and index such that the PLRS can be determined based on the PLRS identifier specified for a configured unified TCI state in the unified TCI state configuration, as described. In an example, the unified TCI state configuration may indicate a single PLRS in the common PLRS list to be applied for all uplink channel transmissions for the unified TCI state (e.g., PUCCH, PUSCH, and SRS).

For example, the common PLRS list can have a format similar to the following:

| PLRS_ID = 0 | PLRS_ID = 1 | PLRS_ID = 2 | PLRS_ID = 3 |
|---|---|---|---|
| PLRS0 | PLRS1 | PLRS2 | PLRS3 |

In this example, where PLRS determining component 254 determines that the unified TCI state configuration indicates PLRS_ID=1 for a configured unified TCI state, PLRS determining component 254 can select PLRS1 for use as a PLRS when transmitting an uplink channel transmission using the unified TCI state, and same PLRS may be used for any type of uplink channel transmission (e.g., for PUCCH, PUSCH, SRS, etc.). PLRS determining component 254 can determine which PLRS in the common PLRS list corresponds to PLRS1, which can include determining a SSB index, CSI-RS index, or other signal identifier indicated in the common PLRS list for PLRS1. For example, if one unified TCI state is indicated to be applicable to uplink channel transmissions of PUSCH and PUCCH, the PLRS identified by (e.g., included in or associated with) the unified TCI state is also applied to the uplink channel transmissions of PUSCH and PUCCH. For another example, if one unified TCI state is indicated to be applicable to uplink channel transmissions of PUSCH only, the PLRS identified by (e.g., included in or associated with) the unified TCI state is also applied to the uplink channel transmissions of PUSCH only.

In method 400, optionally at Block 406, a MAC-CE activating a subset of the common PLRS list can be transmitted. In an aspect, PLRS configuring component 354, e.g., in conjunction with processor(s) 312, memory 316, transceiver 302, BS communicating component 342, etc., can transmit the MAC-CE activating the subset of the common PLRS list. For example, the common PLRS list can indicate multiple PLRSs that can be configured for uplink channel transmissions of a unified TCI state, and the MAC-CE can activate the subset of the multiple PLRSs by indicating a subset of indices associated with PLRSs in the common PLRS list. In some aspects, the MAC-CE may be used to associate a PLRS identifier with a unified TCI state. When downlink control information (DCI) indicates a unified TCI for uplink channel transmissions, the PLRS associated with the unified TCI state may be used for the uplink channel transmissions. In some other aspects, when the unified TCI is configured to include a PLRS by RRC signaling, the MAC-CE activating a subset of unified TCI states may activate a subset of PLRSs associated with the unified TCI states. In this regard, for example, the PLRS identifier indicated in the unified TCI state configuration may map to the activated subset of PLRSs. For example, the PLRS identifier indicated in the unified TCI state configuration may be an index into the activated subset of PLRSs.

In method 500, optionally at Block 506, a MAC-CE activating a subset of the common PLRS list can be received. In an aspect, PLRS determining component 254, e.g., in conjunction with processor(s) 212, memory 216, transceiver 202, UE communicating component 242, etc., can receive the MAC-CE activating the subset of the common PLRS list. For example, the common PLRS list can indicate multiple PLRSs that can be configured for uplink channel transmissions of a unified TCI state, and the MAC-CE can activate the subset of the multiple PLRSs by indicating a subset of indices associated with PLRSs in the common PLRS list. In this regard, for example, the PLRS identifier indicated in the unified TCI state configuration may map to the activated subset of PLRSs. For example, the PLRS identifier indicated in the unified TCI state configuration may be an index into the activated subset of PLRSs, and thus PLRS determining component 254 can determine the PLRS based on mapping the first identifier indicated in the unified TCI state configuration to a second identifier in the activated subset of PLRSs, where the first identifier may be an index into the activated subset of PLRSs, mapping the second identifier indicated in the activated subset of PLRSs to a third identifier in the common PLRS list, where the second identifier may be an index into the common PLRS list, and determining the PLRS that is associated with the third identifier in the common PLRS list.

In method 400, optionally at Block 408, one or more other configurations of multiple PLRS lists can be transmitted. In an aspect, PLRS configuring component 354, e.g., in conjunction with processor(s) 312, memory 316, transceiver 302, BS communicating component 342, etc., can transmit one or more other configurations of multiple PLRS lists. For example, PLRS configuring component 354 can transmit a PLRS list for each of multiple uplink channel transmissions. In an example, PLRS configuring component 354 can transmit a PUCCH PLRS list indicating a list of PLRSs that can be used for PUCCH transmission, a PUSCH PLRS list indicating a list of PLRSs that can be used for PUSCH transmission, a SRS PLRS list indicating a list of PLRSs that can be used for SRS transmission, etc. In this regard, for example, each PLRS list can indicate the PLRS (e.g., SSB index, CSI-RS index, etc. of a signal to be used as a PLRS) and index such that the PLRS can be determined based on the PLRS identifier specified for a configured unified TCI state in the unified TCI state configuration, as described, and based on the PLRS list corresponding to the uplink channel transmission. In an example, the unified TCI state configuration may indicate a single PLRS identifier, which can be used as an index into a PLRS list for a certain type of uplink channel transmission to determine the PLRS for the uplink channel transmission.

In method 500, optionally at Block 508, one or more other configurations of multiple PLRS lists can be received. In an aspect, PLRS determining component 254, e.g., in conjunction with processor(s) 212, memory 216, transceiver 202, UE communicating component 242, etc., can receive one or more other configurations of multiple PLRS lists. For example, PLRS determining component 254 can receive a PLRS list for each of multiple uplink channel transmissions. In an example, PLRS determining component 254 can receive a PUCCH PLRS list indicating a list of PLRSs that can be used for PUCCH transmission, a PUSCH PLRS list indicating a list of PLRSs that can be used for PUSCH transmission, a SRS PLRS list indicating a list of PLRSs that can be used for SRS transmission, etc. In this regard, for example, each PLRS list can indicate the PLRS (e.g., SSB index, CSI-RS index, etc. of a signal to be used as a PLRS) and index such that the PLRS can be determined based on the PLRS identifier specified for a configured unified TCI state in the unified TCI state configuration, as described, and based on the PLRS list corresponding to the uplink channel transmission. In an example, the unified TCI state configuration may indicate a single PLRS identifier, which can be used as an index into a PLRS list for a certain type of uplink channel transmission to determine the PLRS for the uplink channel transmission.

For example, a PUCCH PLRS list can have a format similar to the following:

| PLRS_ID = 0 | PLRS_ID = 1 | PLRS_ID = 2 | PLRS_ID = 3 |
|---|---|---|---|
| PUCCH-PLRS0 | PUCCH-PLRS1 | PUCCH-PLRS2 | PUCCH-PLRS3 |

For example, a PUSCH PLRS list can have a format similar to the following:

| PLRS_ID = 0 | PLRS_ID = 1 | PLRS_ID = 2 | PLRS_ID = 3 |
|---|---|---|---|
| PUSCH-PLRS0 | PUSCH-PLRS1 | PUSCH-PLRS2 | PUSCH-PLRS3 |

For example, a SRS PLRS list can have a format similar to the following:

| PLRS_ID = 0 | PLRS_ID = 1 | PLRS_ID = 2 | PLRS_ID = 3 |
|---|---|---|---|
| SRS-PLRS0 | SRS-PLRS1 | SRS-PLRS2 | SRS-PLRS3 |

In this example, where PLRS determining component 254 determines that the unified TCI state configuration indicates PLRS_ID=1 for a configured unified TCI state, PLRS determining component 254 can select PUCCH-PLRS1 for use as a PLRS when transmitting a PUCCH transmission using the unified TCI state, PUSCH-PLRS1 for use as a PLRS when transmitting a PUSCH transmission using the unified TCI state, or SRS-PLRS1 for use as a PLRS when transmitting a SRS transmission using the unified TCI state, etc. For example, for a PUCCH transmission, PLRS determining component 254 can determine which PLRS corresponds to PUCCH-PLRS1, which can include determining a SSB index, CSI-RS index, or other signal identifier indicated in the PUCCH PLRS list for PUCCH-PLRS1. For example, for a PUSCH transmission, PLRS determining component 254 can determine which PLRS corresponds to PUSCH-PLRS1, which can include determining a SSB index, CSI-RS index, or other signal identifier indicated in the PUSCH PLRS list for PUSCH-PLRS1. For example, for a SRS transmission, PLRS determining component 254 can determine which PLRS corresponds to SRS-PLRS1, which can include determining a SSB index, CSI-RS index, or other signal identifier indicated in the SRS PLRS list for SRS-PLRS1. In this regard, for example, the common PLRS identifier indicated for a unified TCI state can indicate an individual PLRS from each individual PLRS list for each applicable uplink channel (e.g., first PLRS for PUCCH, second PLRS for PUSCH, third PLRS for PUSCH, and first, second, and third PLRS shares a common PLRS identifier, which may be an index into each specific PLRS list.

In method 400, optionally at Block 410, a MAC-CE activating a subset of the multiple PLRS lists can be transmitted. In an aspect, PLRS configuring component 354, e.g., in conjunction with processor(s) 312, memory 316, transceiver 302, BS communicating component 342, etc., can transmit the MAC-CE activating the subset of the multiple PLRS lists. For example, each of the multiple PLRS lists can indicate multiple PLRSs that can be configured for a given type of uplink channel transmission of a unified TCI state, as described, and the MAC-CE can activate the subset of the multiple PLRSs for each PLRS list by indicating a subset of indices associated with PLRSs in the multiple PLRS lists. For example, the MAC-CE may be common for all of the multiple PLRS lists, such that the same subset of indices of PLRSs are activated in each list by the MAC-CE. In another example, the MAC-CE may include multiple individual MAC-CEs used to activate a subset of PLRSs from each individual list. In any case, for example, the PLRS identifier indicated in the unified TCI state configuration may map to the activated subset of PLRSs for a corresponding PLRS list. For example, the PLRS identifier indicated in the unified TCI state configuration may be an index into the activated subset of PLRSs for the corresponding PLRS list.

In method 500, optionally at Block 510, a MAC-CE activating a subset of the multiple PLRS lists can be received. In an aspect, PLRS determining component 254, e.g., in conjunction with processor(s) 212, memory 216, transceiver 202, UE communicating component 242, etc., can receive the MAC-CE activating the subset of the multiple PLRS lists. For example, the each of the multiple PLRS lists can indicate multiple PLRSs that can be configured for a given type of uplink channel transmission of a unified TCI state, as described, and the MAC-CE can activate the subset of the multiple PLRSs for each PLRS list by indicating a subset of indices associated with PLRSs in the multiple PLRS lists. For example, the MAC-CE may be common for all of the multiple PLRS lists, such that the same subset of indices of PLRSs are activated in each list by the MAC-CE. In another example, the MAC-CE may include multiple individual MAC-CEs used to activate a subset of PLRSs from each individual list. In any case, for example, the PLRS identifier indicated in the unified TCI state configuration may map to the activated subset of PLRSs for a corresponding PLRS list. For example, the PLRS identifier indicated in the unified TCI state configuration may be an index into the activated subset of PLRSs for the corresponding PLRS list, and thus PLRS determining component 254 can determine the PLRS based on mapping the first identifier indicated in the unified TCI state configuration to a second identifier in the activated subset of PLRSs for a PLRS list corresponding to the uplink channel transmission type, where the first identifier may be an index into the activated subset of PLRSs, mapping the second identifier indicated in the activated subset of PLRSs to a third identifier in the specific PLRS list specific for the uplink channel transmission type, where the second identifier may be an index into the specific PLRS list, and determining the PLRS that is associated with the third identifier in the specific PLRS list.

In method 400, at Block 412, a PLRS associated with the PLRS identifier can be transmitted. In an aspect, BS communicating component 342, e.g., in conjunction with processor(s) 312, memory 316, transceiver 302, etc., can transmit the PLRS associated with the PLRS identifier. For example, BS communicating component 342 can transmit the SSB, CSI-RS, or other downlink signal indicated as the PLRS over time and/or frequency resources configured for transmitting the signal.

In method 500, at Block 512, a PLRS associated with the PLRS identifier can be received. In an aspect, UE communicating component 242, e.g., in conjunction with processor (s) 212, memory 216, transceiver 202, etc., can receive the PLRS associated with the PLRS identifier. For example, UE communicating component 242 can receive the SSB, CSI-RS, or other downlink signal indicated as the PLRS over time and/or frequency resources configured for transmitting the signal. For example, the UE 104 can be separately configured with, or can otherwise know or determine, resources over which the base station 102 transmits the SSB, CSI-RS, or other downlink signal configured as the PLRS for the UE 104 and/or for a specific uplink channel transmission type.

In method 500, at Block 514, an uplink channel transmission associated with the PLRS and the TCI state identifier can be transmitted. In an aspect, UE communicating component 242, e.g., in conjunction with processor(s) 212, memory 216, transceiver 202, etc., can transmit the uplink channel transmission associated with the PLRS and the TCI state identifier. For example, UE communicating component 242 can transmit the uplink channel transmission over time and/or frequency resources granted by the base station 102, and using one or more properties associated with the unified TCI state, such as a beamforming direction, or other quasi-colocation (QCL) parameters (e.g., parameters defined in the wireless communication technology, such as QCL type A, or QCL type D as defined for different time, frequency, spatial parameters in 5G NR). In addition, for example, UE communicating component 242 can transmit the uplink channel transmission using the PLRS as a path loss reference for transmission, where the PLRS can be determined based on the PLRS identifier associated with the unified TCI state and/or by mapping the identifier to a PLRS in a common PLRS list or in a specific PLRS list for the uplink channel transmission type (e.g., PUCCH, PUSCH, SRS, etc.), as described. For example, communicating component 242 may transmit the uplink transmission using a spatial transmit filter determined by the indicated unified TCI and using a transmit power based on the estimate of downlink path loss associated with the indicated PLRS.

In method 400, at Block 414, an uplink channel transmission associated with the PLRS and the TCI state identifier can be received. In an aspect, BS communicating component 342, e.g., in conjunction with processor(s) 312, memory 316, transceiver 302, etc., can receive the uplink channel transmission associated with the PLRS and the TCI state identifier. For example, BS communicating component 342 can receive the uplink channel transmission having one or more properties associated with the unified TCI state, such as a beamforming direction, or other quasi-colocation parameters.

Figure 6:
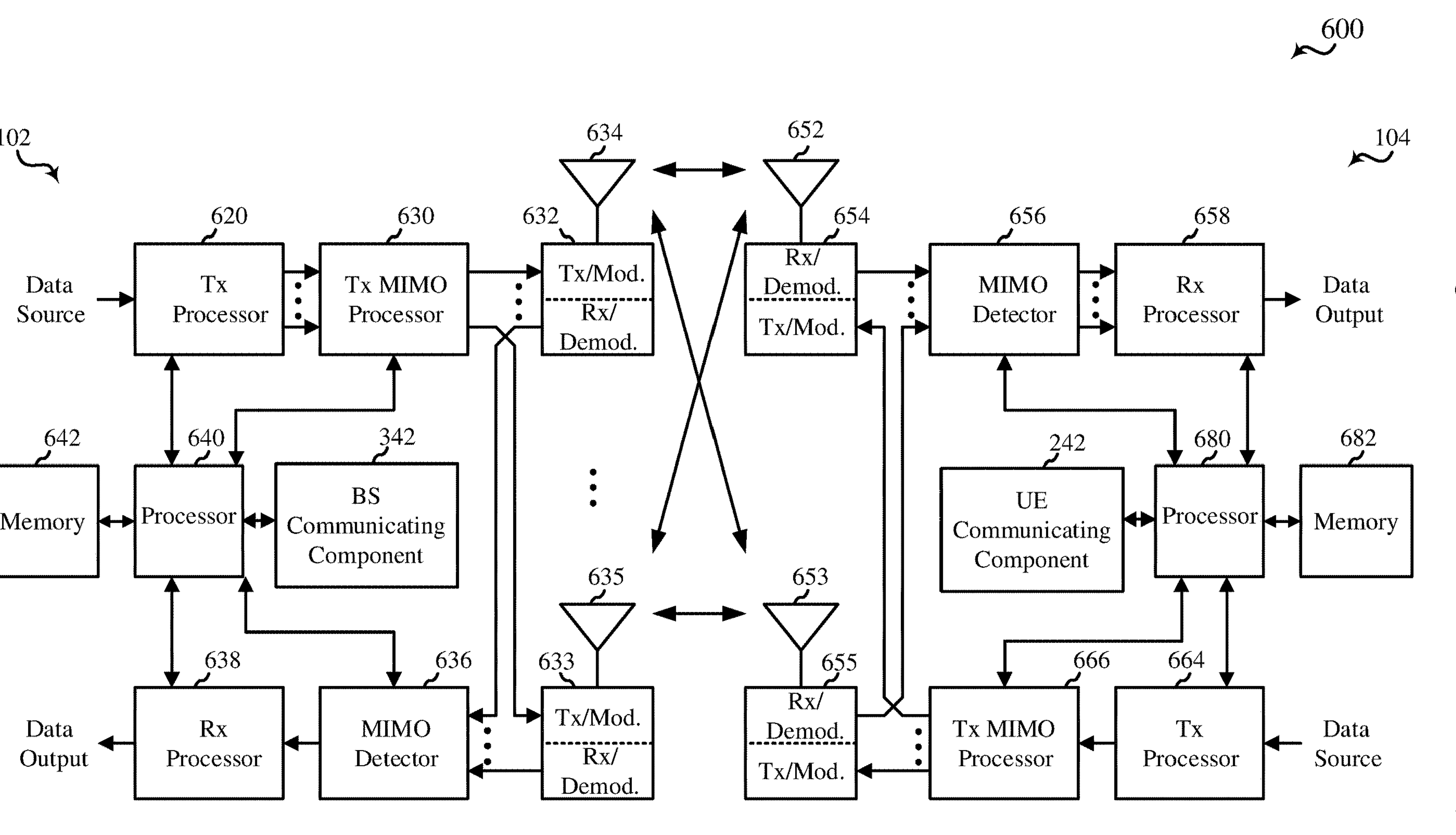
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a UE communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication at a UE including receiving a configuration for a unified TCI state that includes a TCI state identifier and a PLRS identifier, receiving a PLRS associated with the PLRS identifier, and transmitting an uplink channel transmission associated with the PLRS and the TCI state identifier.

In Aspect 2, the method of Aspect 1 includes where the uplink channel transmission corresponds to at least one of an uplink control channel, an uplink shared channel, or a sounding reference signal.

In Aspect 3, the method of any of Aspects 1 or 2 includes where the PLRS identifier indicates a PLRS from a common PLRS list, where the common PLRS list indicates a common PLRS for any uplink channel transmission.

In Aspect 4, the method of Aspect 3 includes receiving a second configuration of the common PLRS list, where the common PLRS list indicates multiple PLRSs and associated PLRS identifiers including the PLRS identifier indicated in the configuration for the unified TCI state.

In Aspect 5, the method of Aspect 4 includes receiving a MAC-CE activating a subset of the common PLRS list, where the PLRS identifier is an index into the subset of the common PLRS list.

In Aspect 6, the method of any of Aspects 1 or 2 includes where the PLRS identifier indicates a PLRS from a PLRS list specific to a type of the uplink channel transmission.

In Aspect 7, the method of Aspect 6 includes receiving one or more other configurations of multiple PLRS lists, each of the multiple PLRS lists being for one of multiple types of uplink channel transmissions, where the one or more other configurations include the PLRS list specific to the type of the uplink channel transmission.

In Aspect 8, the method of Aspect 7 includes where each of the multiple PLRS lists are for one of an uplink control channel, an uplink shared channel, and a sounding reference signal.

In Aspect 9, the method of Aspect 8 includes receiving a MAC-CE activating a subset of the PLRS lists, where the MAC-CE is common to activate a subset of each of the multiple PLRS lists, and where the PLRS identifier is an index into the subset of the PLRS list.

In Aspect 10, the method of any of Aspects 6 to 8 includes receiving a MAC-CE activating a subset of the PLRS lists, where the MAC-CE is one of multiple MAC-CEs for each of the multiple PLRS lists and is specific to activate the subset of the PLRS list, and where the PLRS identifier is an index into the subset of the PLRS list.

In Aspect 11, the method of any of Aspects 1 to 10 includes where the PLRS is one of a SSB signal or a CSI-RS.

Aspect 12 is a method for wireless communication at a network node including transmitting a configuration for a unified TCI state that includes a TCI state identifier and a PLRS identifier, transmitting a PLRS associated with on the PLRS identifier, and receiving an uplink channel transmission associated with the PLRS and the TCI state identifier.

In Aspect 13, the method of Aspect 12 includes where the uplink channel transmission corresponds to at least one of an uplink control channel, an uplink shared channel, or a sounding reference signal.

In Aspect 14, the method of any of Aspects 12 or 13 includes where the PLRS identifier indicates a PLRS from a common PLRS list, where the common PLRS list indicates a common PLRS for any uplink channel transmission.

In Aspect 15, the method of Aspect 14 includes transmitting a second configuration of the common PLRS list, where the common PLRS list indicates multiple PLRSs and associated PLRS identifiers including the PLRS identifier indicated in the configuration for the unified TCI state.

In Aspect 16, the method of Aspect 15 includes transmitting a MAC-CE activating a subset of the common PLRS list, where the PLRS identifier is an index into the subset of the common PLRS list.

In Aspect 17, the method of any of Aspects 12 or 13 includes where the PLRS identifier indicates a PLRS from a PLRS list specific to a type of the uplink channel transmission.

In Aspect 18, the method of Aspect 17 includes transmitting one or more other configurations of multiple PLRS lists, each of the multiple PLRS lists being for one of multiple types of uplink channel transmissions, where the one or more other configurations include the PLRS list specific to the type of the uplink channel transmission.

In Aspect 19, the method of Aspect 18 includes where each of the multiple PLRS lists are for one of an uplink control channel, an uplink shared channel, and a sounding reference signal.

In Aspect 20, the method of Aspect 19 includes transmitting a MAC-CE activating a subset of the PLRS list, where the MAC-CE is common to activate a subset of each of the multiple PLRS lists, and where the PLRS identifier is an index into the subset of the PLRS list.

In Aspect 21, the method of any of Aspects 17 to 19 includes transmitting a MAC-CE activating a subset of the PLRS list, where the MAC-CE is one of multiple MAC-CEs for each of the multiple PLRS lists and is specific to activate the subset of the PLRS list, and where the PLRS identifier is an index into the subset of the PLRS list.

In Aspect 22, the method of any of Aspects 12 to 21 includes where the PLRS is one of a SSB signal or a CSI-RS.

Aspect 23 is an apparatus for wireless communication including a transceiver, a memory configured to store instructions, and one or more processors communicatively coupled with the transceiver and the memory, where the one or more processors are configured to execute the instructions to perform the operations of one or more methods in Aspects 1 to 22.

Aspect 24 is an apparatus for wireless communication including means for performing the operations of one or more methods in Aspects 1 to 22.

Aspect 25 is a computer-readable medium including code executable by one or more processors to perform the operations of one or more methods in Aspects 1 to 22.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a user equipment (UE), comprising:

receiving a configuration of at least one path loss reference signal (PLRS) list for uplink channel transmissions, wherein the at least one PLRS list indicates multiple PLRSs and associated PLRS identifiers, wherein the at least one PLRS list includes one of:

a common PLRS list indicating common PLRSs for any uplink channel transmission, or multiple PLRS lists, each PLRS list of the multiple PLRS lists being specific to one of an uplink control channel, an uplink shared channel, or a sounding reference signal;

receiving a second configuration for a unified transmission configuration indicator (TCI) state that includes a TCI state identifier and a PLRS identifier, wherein the PLRS identifier indicates a PLRS from the at least one PLRS list;

receiving a PLRS associated with the PLRS identifier; and transmitting an uplink channel transmission associated with the PLRS and the TCI state identifier.

2. The method of claim 1, wherein the uplink channel transmission corresponds to at least one of an uplink control channel, an uplink shared channel, or a sounding reference signal.

3. The method of claim 1, wherein the at least one PLRS list includes the common PLRS list.

4. The method of claim 3, wherein the common PLRS list indicates multiple PLRSs and associated PLRS identifiers including the PLRS identifier indicated in the configuration for the unified TCI state.

5. The method of claim 3, further comprising receiving a media access control (MAC) control element (CE) activating a subset of the common PLRS list, wherein the PLRS identifier is an index into the subset of the common PLRS list.

6. The method of claim 1, wherein the at least one PLRS list includes the multiple PLRS lists.

7. The method of claim 6, further comprising receiving a media access control (MAC)-control element (CE) activating a subset of the multiple PLRS lists, wherein the MAC-CE is common to activate a subset of each of the multiple PLRS lists, and wherein the PLRS identifier is an index into the subset of the multiple PLRS lists.

8. The method of claim 6, further comprising receiving a media access control (MAC)-control element (CE) activating a subset of the multiple PLRS lists, wherein the MAC-CE is one of multiple MAC-CEs for each of the multiple PLRS lists and is specific to activate the subset of the multiple PLRS lists, and wherein the PLRS identifier is an index into the subset of the multiple PLRS lists.

9. The method of claim 1, wherein the PLRS is one of a synchronization signal block (SSB) signal or a channel state information reference signal (CSI-RS).

10. A method for wireless communication at a network node, comprising:

transmitting a configuration of at least one path loss reference signal (PLRS) list for uplink channel transmissions, wherein the at least one PLRS list indicates multiple PLRSs and associated PLRS identifiers, wherein the at least one PLRS list includes one of:

a common PLRS list indicating common PLRSs for any uplink channel transmission, or multiple PLRS lists, each PLRS list of the multiple PLRS lists being specific to one of an uplink control channel, an uplink shared channel, or a sounding reference signal;

transmitting a second configuration for a unified transmission configuration indicator (TCI) state that includes a TCI state identifier and a PLRS identifier, wherein the PLRS identifier indicates a PLRS from the at least one PLRS list;

transmitting a PLRS associated with the PLRS identifier; and receiving an uplink channel transmission associated with the PLRS and the TCI state identifier.

11. The method of claim 10, wherein the uplink channel transmission corresponds to at least one of an uplink control channel, an uplink shared channel, or a sounding reference signal.

12. The method of claim 10, wherein the at least one PLRS list includes the common PLRS list.

13. An apparatus for wireless communication, comprising:

a transceiver;

one or more memories configured to, individually or in combination, store instructions; and one or more processors communicatively coupled with the one or more memories, wherein the one or more processors are, individually or in combination, configured to execute the instructions to cause the apparatus to:

receive a configuration of at least one path loss reference signal (PLRS) list for uplink channel transmissions, wherein the at least one PLRS list indicates multiple PLRSs and associated PLRS identifiers, wherein the at least one PLRS list includes one of:

a common PLRS list indicating common PLRSs for any uplink channel transmission, or multiple PLRS lists, each PLRS list of the multiple PLRS lists being specific to one of an uplink control channel, an uplink shared channel, or a sounding reference signal;

receive a second configuration for a unified transmission configuration indicator (TCI) state that includes a TCI state identifier and a PLRS identifier, wherein the PLRS identifier indicates a PLRS from the at least one PLRS list;

receive a PLRS associated with the PLRS identifier; and transmit an uplink channel transmission associated with the PLRS and the TCI state identifier.

14. The apparatus of claim 13, wherein the uplink channel transmission corresponds to at least one of an uplink control channel, an uplink shared channel, or a sounding reference signal.

15. The apparatus of claim 13, wherein the at least one PLRS list includes the common PLRS list.

16. The apparatus of claim 15, wherein the common PLRS list indicates multiple PLRSs and associated PLRS identifiers including the PLRS identifier indicated in the configuration for the unified TCI state.

17. The apparatus of claim 15, wherein the one or more processors are, individually or in combination, configured to execute the instructions to cause the apparatus to receive a media access control (MAC) control element (CE) activating a subset of the common PLRS list, wherein the PLRS identifier is an index into the subset of the common PLRS list.

18. The apparatus of claim 13, wherein the at least one PLRS list includes the PLRS lists.

19. The apparatus of claim 18, wherein the one or more processors are, individually or in combination, configured to execute the instructions to cause the apparatus to receive a media access control (MAC)-control element (CE) activating a subset of the multiple PLRS lists, wherein the MAC-CE is common to activate a subset of each of the multiple PLRS lists, and wherein the PLRS identifier is an index into the subset of the multiple PLRS lists.

20. The apparatus of claim 18, wherein the one or more processors are, individually or in combination, configured to execute the instructions to cause the apparatus to receive a media access control (MAC)-control element (CE) activating a subset of the multiple PLRS lists, wherein the MAC-CE is one of multiple MAC-CEs for each of the multiple PLRS lists and is specific to activate the subset of the multiple PLRS lists, and wherein the PLRS identifier is an index into the subset of the multiple PLRS lists.

21. The apparatus of claim 13, wherein the PLRS is one of a synchronization signal block (SSB) signal or a channel state information reference signal (CSI-RS).

22. An apparatus for wireless communication, comprising:

a transceiver;

one or more memories configured to, individually or in combination, store instructions; and one or more processors communicatively coupled with the one or more memories, wherein the one or more processors are, individually or in combination, configured to execute the instructions to cause the apparatus to:

transmit a configuration of at least one path loss reference signal (PLRS) list for uplink channel transmissions, wherein the at least one PLRS list indicates multiple PLRSs and associated PLRS identifiers, wherein the at least one PLRS list includes one of:

a common PLRS list indicating common PLRSs for any uplink channel transmission, or multiple PLRS lists, each PLRS list of the multiple PLRS lists being specific to one of an uplink control channel, an uplink shared channel, or a sounding reference signal;

transmit a second configuration for a unified transmission configuration indicator (TCI) state that includes a TCI state identifier and a PLRS identifier, wherein the PLRS identifier indicates a PLRS from the at least one PLRS list;

transmit a PLRS associated with the PLRS identifier; and receive an uplink channel transmission associated with the PLRS and the TCI state identifier.

23. The apparatus of claim 22, wherein the uplink channel transmission corresponds to at least one of an uplink control channel, an uplink shared channel, or a sounding reference signal.

24. The apparatus of claim 22, wherein the at least one PLRS list includes the common PLRS list.

25. The apparatus of claim 24, wherein the common PLRS list indicates multiple PLRSs and associated PLRS identifiers including the PLRS identifier indicated in the configuration for the unified TCI state.

26. The apparatus of claim 24, wherein the one or more processors are, individually or in combination, configured to execute the instructions to cause the apparatus to transmit a media access control (MAC) control element (CE) activating a subset of the common PLRS list, wherein the PLRS identifier is an index into the subset of the common PLRS list.

27. The apparatus of claim 22, wherein the at least one PLRS list includes the multiple PLRS lists.

28. The apparatus of claim 27, wherein the one or more processors are, individually or in combination, configured to execute the instructions to cause the apparatus to transmit a media access control (MAC)-control element (CE) activating a subset of the multiple PLRS lists, wherein the MAC-CE is common to activate a subset of each of the multiple PLRS lists, and wherein the PLRS identifier is an index into the subset of the multiple PLRS lists.

29. The apparatus of claim 27, wherein the one or more processors are, individually or in combination, configured to execute the instructions to cause the apparatus to transmit a media access control (MAC)-control element (CE) activating a subset of the multiple PLRS lists, wherein the MAC-CE is one of multiple MAC-CEs for each of the multiple PLRS lists and is specific to activate the subset of the multiple PLRS lists, and wherein the PLRS identifier is an index into the subset of the multiple PLRS lists.

30. The apparatus of claim 22, wherein the PLRS is one of a synchronization signal block (SSB) signal or a channel state information reference signal (CSI-RS).

* * * * *